(12) United States Patent
Mountz

(10) Patent No.: US 11,759,028 B2
(45) Date of Patent: *Sep. 19, 2023

(54) PLAY YARD

(71) Applicant: Wonderland Switzerland AG, Steinhausen (CH)

(72) Inventor: Jonathan K. Mountz, Birdsboro, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,028

(22) Filed: Dec. 27, 2021

(65) Prior Publication Data
US 2022/0117410 A1 Apr. 21, 2022

Related U.S. Application Data

(63) Continuation of application No. 16/285,239, filed on Feb. 26, 2019, now Pat. No. 11,241,101.
(Continued)

(51) Int. Cl.
*A47D 13/06* (2006.01)
*A47D 7/00* (2006.01)
(Continued)

(52) U.S. Cl.
CPC ............ *A47D 13/063* (2013.01); *F16B 12/56* (2013.01); *A47D 7/002* (2013.01); *A47D 9/005* (2013.01); *A47D 13/061* (2013.01)

(58) Field of Classification Search
CPC .... A47D 13/063; A47D 13/061; A47D 13/06; A47D 9/00; A47D 9/005; A47D 7/00;
(Continued)

(56) References Cited

U.S. PATENT DOCUMENTS 2,908,021 A 10/1959 Fulton
2,991,486 A 7/1961 Hamilton
(Continued)

FOREIGN PATENT DOCUMENTS

CN 2790864 Y 6/2006
CN 2922647 Y 7/2007
(Continued)

*Primary Examiner* — Robert G Santos
(74) *Attorney, Agent, or Firm* — Winston Hsu

(57) ABSTRACT

A play yard can be locked in an unfolded position via a latch mechanism or unlocked by the latch mechanism to fold to a folded position, by means of lifting a central member and bringing the rail members, the upper support members, the lower support members, and the connecting members to rotate toward the center of the play yard. A spring-loaded engaging member disposed on the rail member can have engagement with the bracket so that the play yard can be stably retained in the folded position. When the engaging member is operated to disengage from the bracket, the rail members, the upper support members, the lower support members, and the connecting members rotate away from the center of the play yard all the way to the unfolded position until the connecting members can be locked by the latch mechanism, which retains the play yard in the unfolded position.

20 Claims, 10 Drawing Sheets

Related U.S. Application Data

(60) Provisional application No. 62/635,181, filed on Feb. 26, 2018.

(51) Int. Cl.
*F16B 12/56* (2006.01)
*A47D 9/00* (2006.01)

(58) Field of Classification Search
CPC .... A47D 7/002; A47D 15/003; A47D 15/001; F16B 12/56; F16B 12/54
USPC .......................................... 5/99.1, 98.1, 93.1
See application file for complete search history.

(56) References Cited

U.S. PATENT DOCUMENTS

| | | |
|---|---|---|
| RE25,195 E | 7/1962 | Hamilton |
| 3,999,229 A | 12/1976 | Wyss |
| 4,499,619 A | 2/1985 | Kassai |
| 4,635,305 A | 1/1987 | Wyss |
| 4,683,600 A | 8/1987 | Beger |
| 5,193,234 A | 3/1993 | Joaquin |
| 5,241,716 A | 9/1993 | Kohus |
| 5,617,592 A | 4/1997 | Cheng |
| 5,791,804 A | 8/1998 | Cheng |
| 6,434,767 B1 | 8/2002 | Welsh, Jr. |
| 7,770,245 B2 | 8/2010 | Cheng |
| 8,966,680 B2 | 3/2015 | Dowd |
| 9,345,339 B2 | 5/2016 | Wang |
| 9,901,187 B2 | 2/2018 | Burkholder |
| 10,694,865 B2 | 6/2020 | Yang |
| RE48,148 E | 8/2020 | Wang |
| 11,147,392 B2 * | 10/2021 | Mountz .................. A47D 7/002 |
| 11,241,101 B2 * | 2/2022 | Mountz .................. F16B 12/56 |
| 2002/0092094 A1 | 7/2002 | Welsh, Jr. |
| 2006/0021137 A1 | 2/2006 | Waldman |
| 2008/0189854 A1 | 8/2008 | Thorne |
| 2009/0025148 A1 | 1/2009 | Cheng |
| 2013/0074257 A1 | 3/2013 | Mendes |
| 2013/0160205 A1 | 6/2013 | Dowd |
| 2014/0165288 A1 | 6/2014 | Wang |
| 2014/0208505 A1 | 7/2014 | Burkholder |
| 2014/0283298 A1 | 9/2014 | Cheng |
| 2018/0008056 A1 | 1/2018 | Yang |
| 2018/0303250 A1 | 10/2018 | Mountz |
| 2019/0261783 A1 | 8/2019 | Mountz |
| 2022/0000277 A1 * | 1/2022 | Mountz ................ A47D 13/061 |
| 2022/0117410 A1 * | 4/2022 | Mountz ................ A47D 13/063 |

FOREIGN PATENT DOCUMENTS

| | | |
|---|---|---|
| CN | 101291605 A | 10/2008 |
| CN | 101305878 A | 11/2008 |
| CN | 202751094 U | 2/2013 |
| CN | 104382422 A | 3/2015 |
| CN | 104510224 A | 4/2015 |
| CN | 205306532 U | 6/2016 |
| CN | 105982467 A | 10/2016 |

* cited by examiner

PLAY YARD

CROSS REFERENCE TO RELATED APPLICATIONS

This application is a continuation application of U.S. application Ser. No. 16/285,239, filed on Feb. 26, 2019, now U.S. Pat. No. 11,241,101, which claims the benefit of U.S. Provisional Application No. 62/635,181, filed on Feb. 26, 2018. The contents of these applications are incorporated herein by reference.

BACKGROUND OF THE INVENTION

1. Field of the Invention

The invention relates to a play yard and, more particularly, to a play yard capable of being folded or unfolded easily and rapidly.

2. Description of the Prior Art

For a parent or care giver, a play yard is a practical tool to take care infants or children. In general, the play yard provides rest or entertainment space for infants or children. To reduce space occupied by the play yard for shipment or storage, most of the play yards are foldable and the size of the play yard can be reduced after being folded. However, the folding and unfolding process of the conventional play yard requires multiple steps, which brings inconvenience for the parent or care giver.

SUMMARY OF THE INVENTION

An objective of the invention is to provide a play yard capable of being folded or unfolded easily and rapidly.

According to an embodiment of the invention, a play yard is configurable to an unfolded position or a folded position. The play yard includes two brackets, two rail members, and two support frames. The rail members are pivotally connected to the brackets. Each of the support frames includes two upper support members and a lower support member. The upper support members are pivotally connected to the brackets, and the lower support member is pivotally connected to the upper support members. When the play yard is configured to the folded position, the rail members, the upper support members, and the lower support members are folded with respect to one another.

As mentioned in the above, the invention utilizes the engaging members to lock the rail members and at least one bracket in such a way that when the play yard is configured to the folded position, the rail members will be securely retained in the folded position. If a user wants to fold the play yard for shipment or storage, the user can operate the latch mechanism to unlock the connecting members and then lift the central member, such that the rail members, the upper support members, the lower support member and the connecting members rotate toward the center of the play yard. Consequently, the rail members, the upper support members, the lower support member and the connecting members are folded with respect to each other. Accordingly, the folding and unfolding process of the play yard of the invention can be performed with minimal steps, such that the operation is very convenient for the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
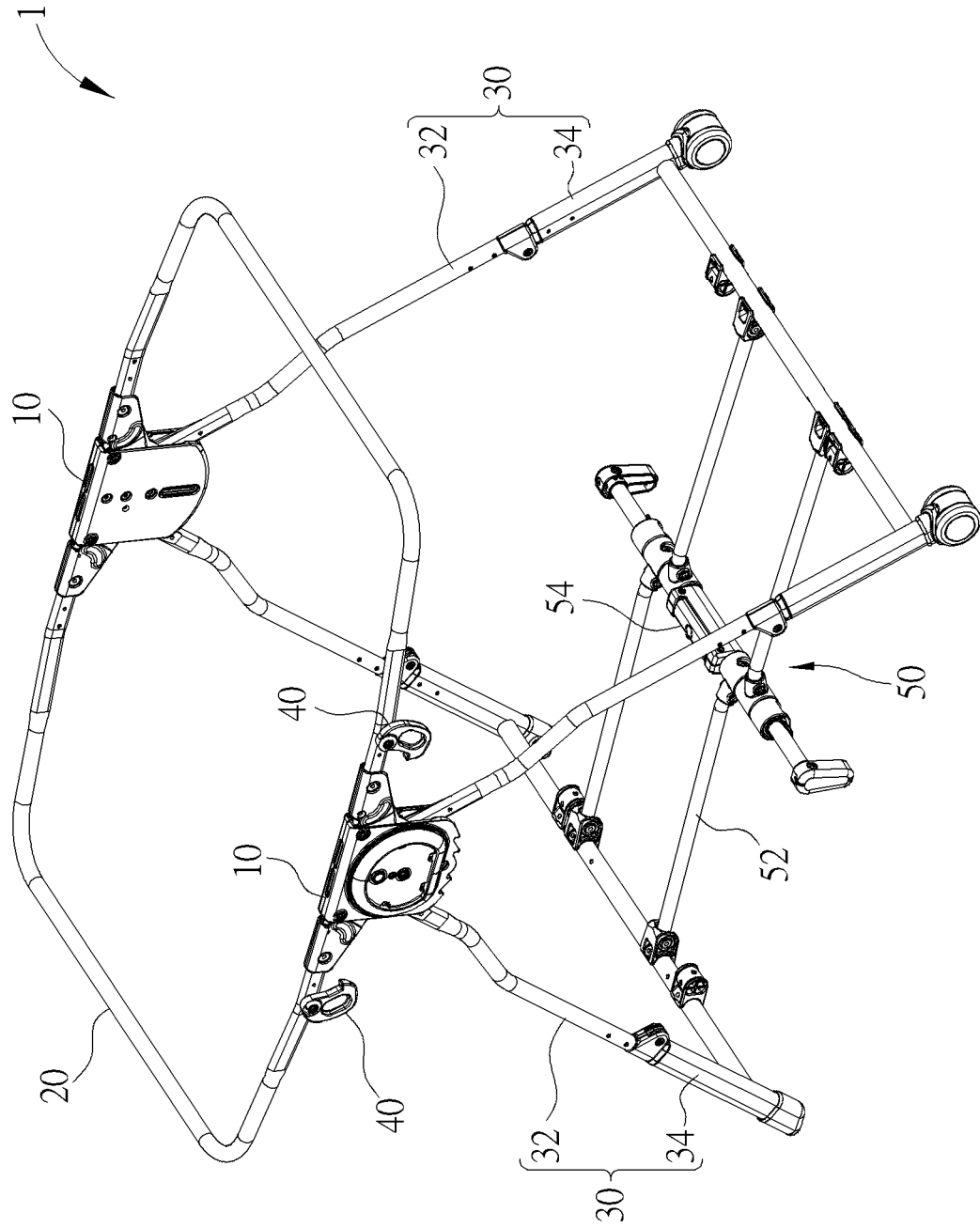
FIG. 1 is a perspective view of a play yard according to an embodiment of the invention.
Figure 2:
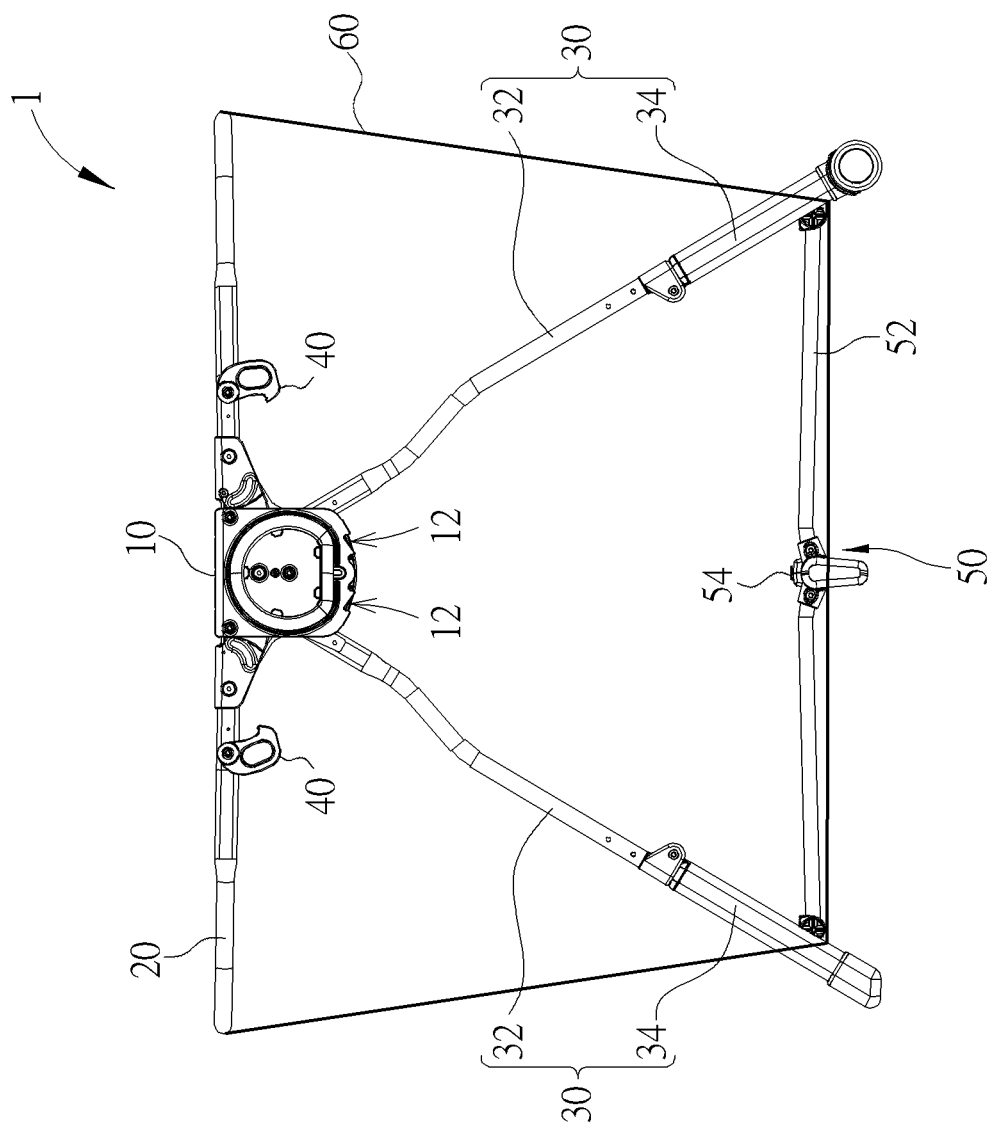
FIG. 2 is a side view illustrating the play yard shown in FIG. 1 with a softgoods clothing.
Figure 3:
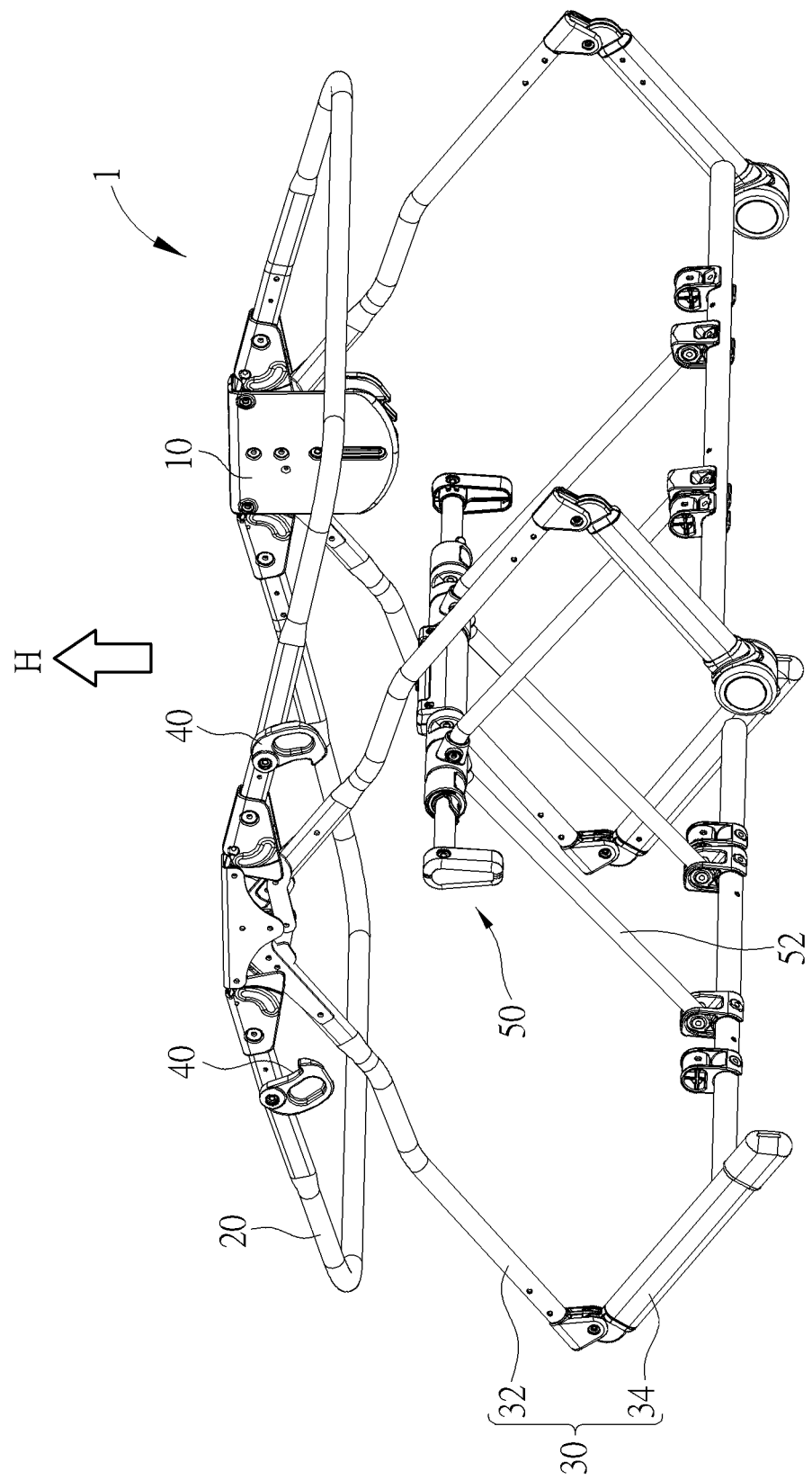
FIG. 3 is a perspective view illustrating the central member shown in FIG. 1 being lifted.

Please refer to FIG. 1 to FIG. 3, FIG. 1 is a perspective view of a play yard 1 according to an embodiment of the invention, FIG. 2 is a side view illustrating the play yard 1 shown in FIG. 1 with a softgoods clothing, and FIG. 3 is a perspective view illustrating the central member 50 shown in FIG. 1 being lifted.

Figure 10:
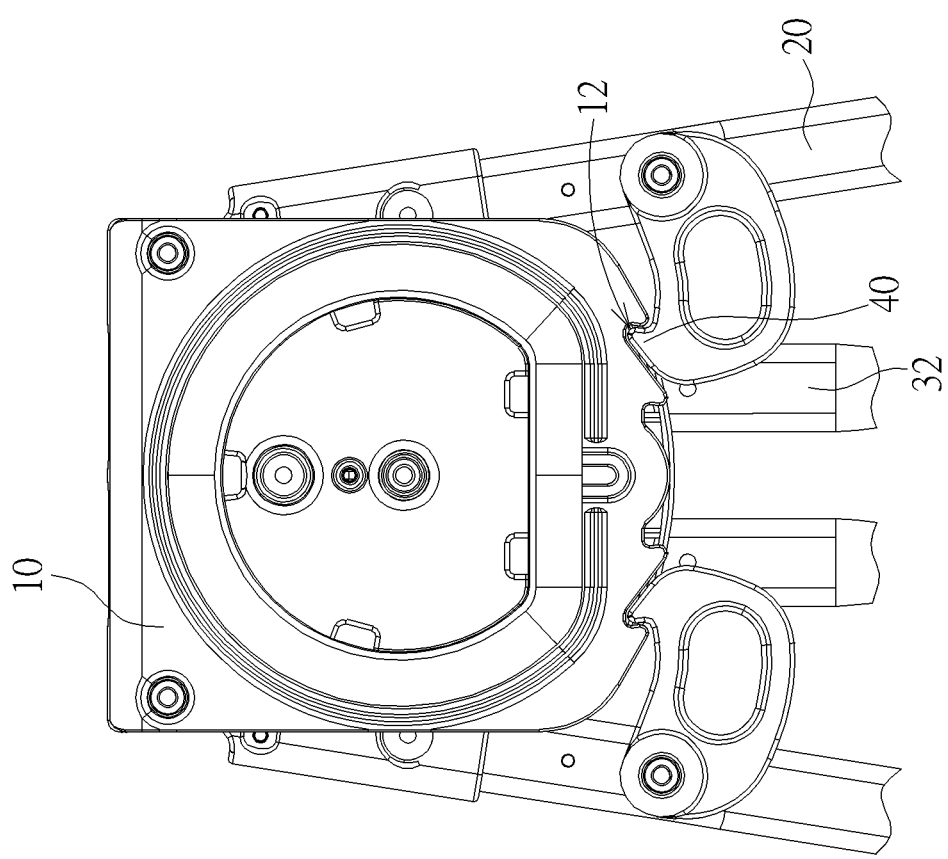
FIG. 10 is a side view illustrating the play yard in part being fully folded to the folded position.

The play yard 1 can be configured to an unfolded position (as shown in FIG. 1) or a folded position (the fully folded position of the play yard 1 in part is shown in FIG. 10). As shown in FIG. 1, the play yard 1 includes two brackets 10, two rail members 20, two support frames 30, two engaging members 40, a central member 50, a plurality of connecting members 52, and a latch mechanism 54. The rail members 20 are pivotally connected to the brackets 10. Each of the support frames 30 includes two upper support members 32 and a lower support member 34. The upper support members 32 are pivotally connected to the brackets 10 and the lower support member 34 is pivotally connected to the upper support members 32. The two engaging members 40 are respectively disposed on each of the two rail members 20. In this embodiment, the engaging members 40 are spring-loaded and rotatable on the rail members 20.

The connecting members 52 are pivotally connected to the central member 50 and the lower support member 34. The latch mechanism 54 is configured to lock or unlock the connecting members 52, so as to unfold or fold the play yard 1. In this embodiment, the latch mechanism 54 is disposed on the central member 50, but is not so limited. In another embodiment, the latch mechanism 54 may be disposed at an appropriate position near the central member 50. Referring to FIG. 2, the play yard 1 further includes a softgoods clothing 60 covering the rail members 20, the support frames 30, the central member 50, and the connecting members 52.

Figure 6:
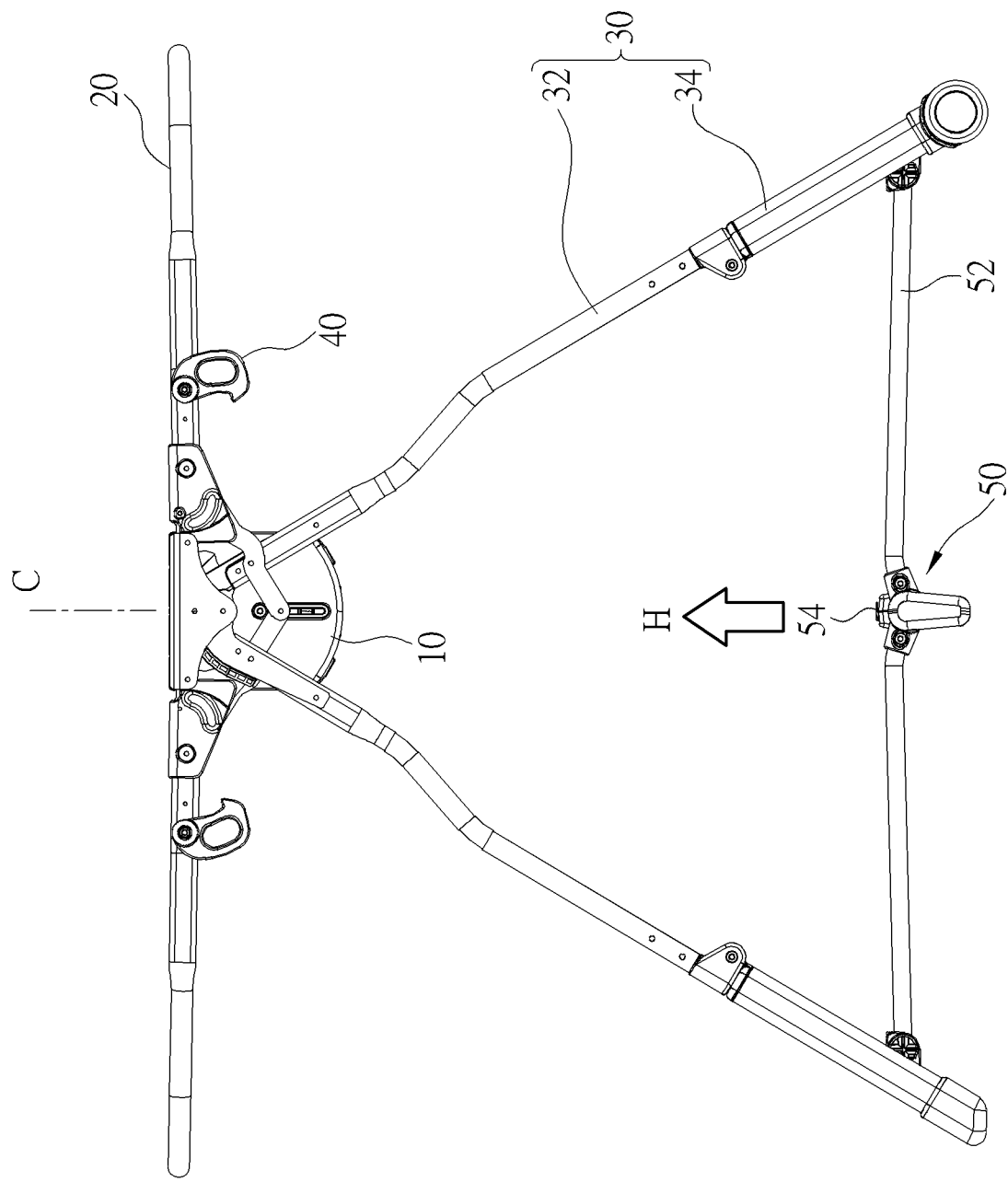
FIG. 6 is a side view illustrating the play yard fully unfolded.

As shown in FIG. 1, when the connecting members 52 are unfolded and the latch mechanism 54 locks the connecting members 52, the rail members 20, the upper support members 32, the lower support members 34, and the connecting members 52 are retained unfolded with respect to each other, such that the play yard 1 is situated in the unfolded position shown in FIG. 1 stably. To fold the play yard 1, operating the latch mechanism 54 to unlock the connecting members 52 allows the central member 50 to be lifted along direction H as shown in FIG. 3, and the rail members 20, the upper support members 32, the lower support members 34, and the connecting members 52 are foldable with respect to one another, or toward a center C of the play yard 1 (as shown in FIG. 6), to be more specific.

Figure 4:
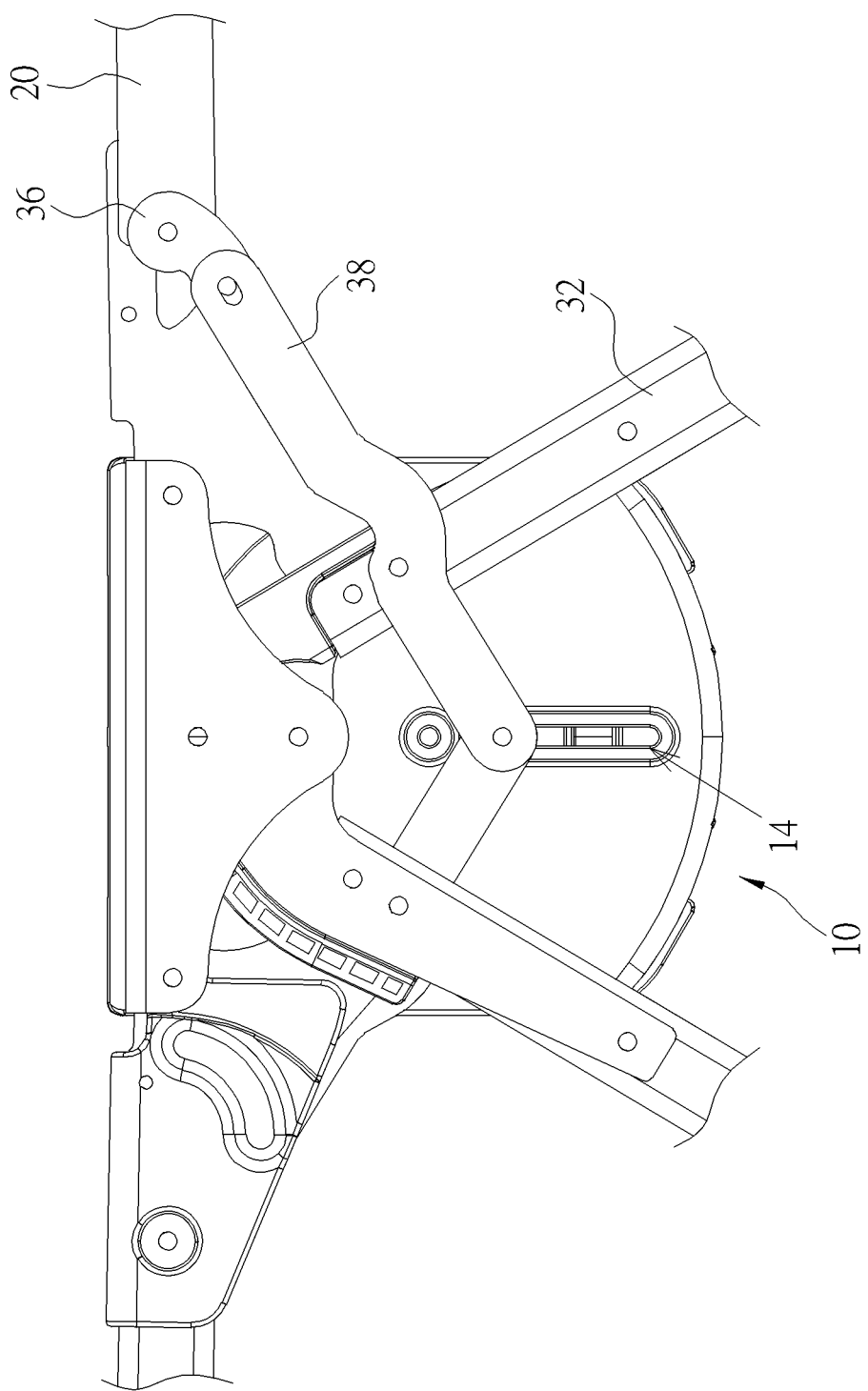
FIG. 4 is a side view illustrating portion of the bracket and the rail member.
Figure 5:
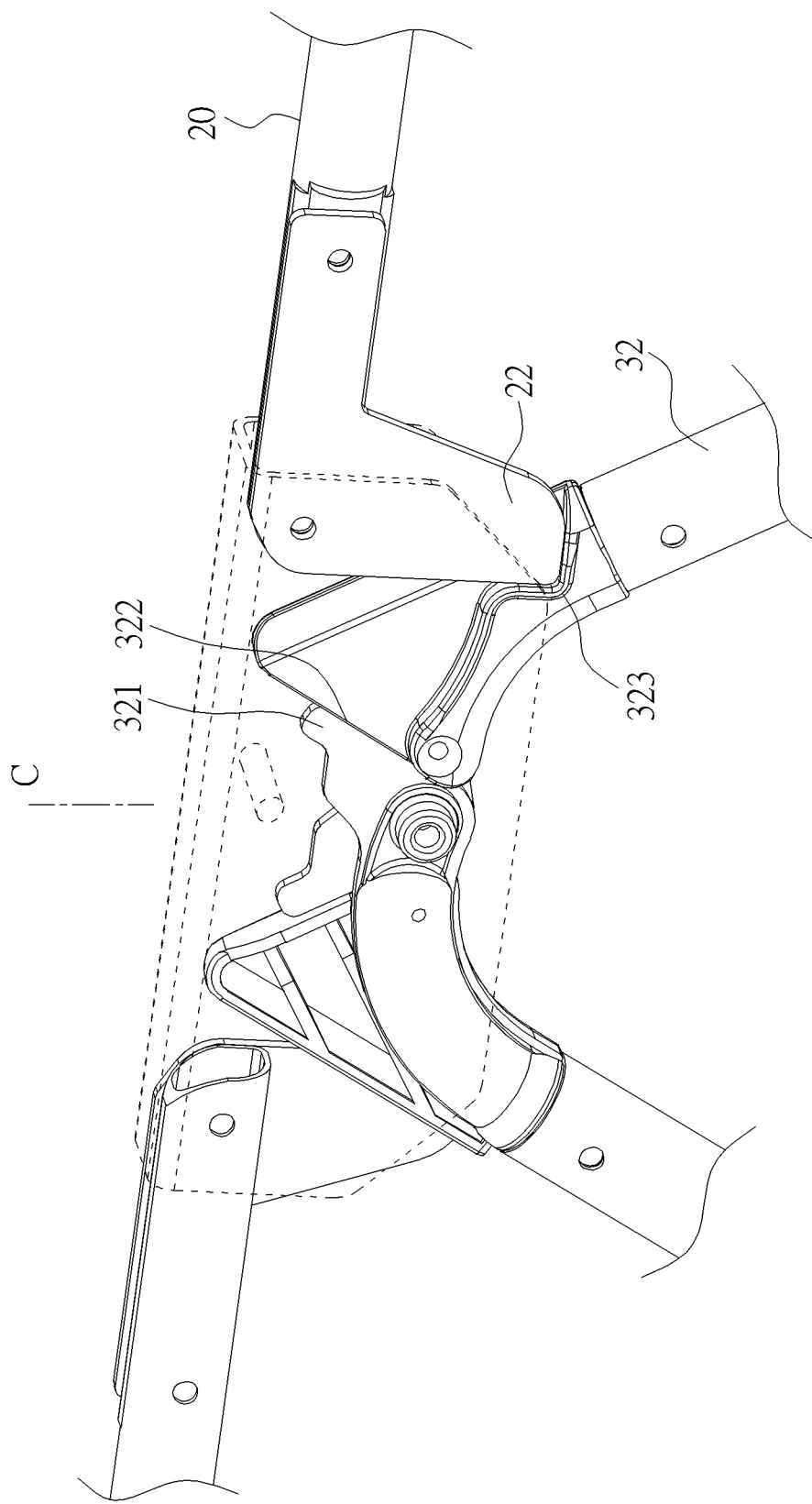
FIG. 5 is a perspective view illustrating the rail member and the upper support member.

Referring to FIG. 4 and FIG. 5, FIG. 4 is a side view illustrating portion of the bracket 10 and the rail member 20 and FIG. 5 is a perspective view illustrating the rail member 20 and the upper support member 32. As shown in FIG. 4, the play yard 1 further includes first linkage members 36 and second linkage members 38 pivotally disposed on the rail members 20, the brackets 10, and the upper support members 32. The bracket 10 has a sliding groove 14, the first linkage member 36 is pivotally connected to the rail member 20 and the second linkage member 38, and the second linkage member 38 is pivotally connected to the sliding groove 14. Accordingly, the second linkage members 38 can be rotating and sliding with respect to the sliding grooves 14 as the rail members 20 are rotated with respect to the brackets 10 between the unfolded position and the folded position. The linkage of the first linkage members 36, the second linkage members 38, and the sliding grooves 14 helps the balance and consistence of the folding and unfolding process.

As shown in FIG. 5, the rail member 20 has a first engaging portion 22 and the upper support member 32 has a second engaging portion 323. When the rail member 20 and the upper support member 32 are unfolded with respect to each other, the first engaging portion 22 engages with the second engaging portion 323, such that the rail member 20 is retained in a horizontal position. Furthermore, the upper support member 32 has a first stop portion 321 and a second stop portion 322. When the upper support members 32 are unfolded, the first stop portion 321 of one of the upper support members 32 abuts against the second stop portion 322 of the other one of the upper support members 32.

When the central member 50 is lifted, the upper support member 32 rotates toward the center C of the play yard 1 to disengage the second engaging portion 323 from the first engaging portion 22, such that the rail members 20 are rotatable toward the center C of the play yard 1.

Figure 7:
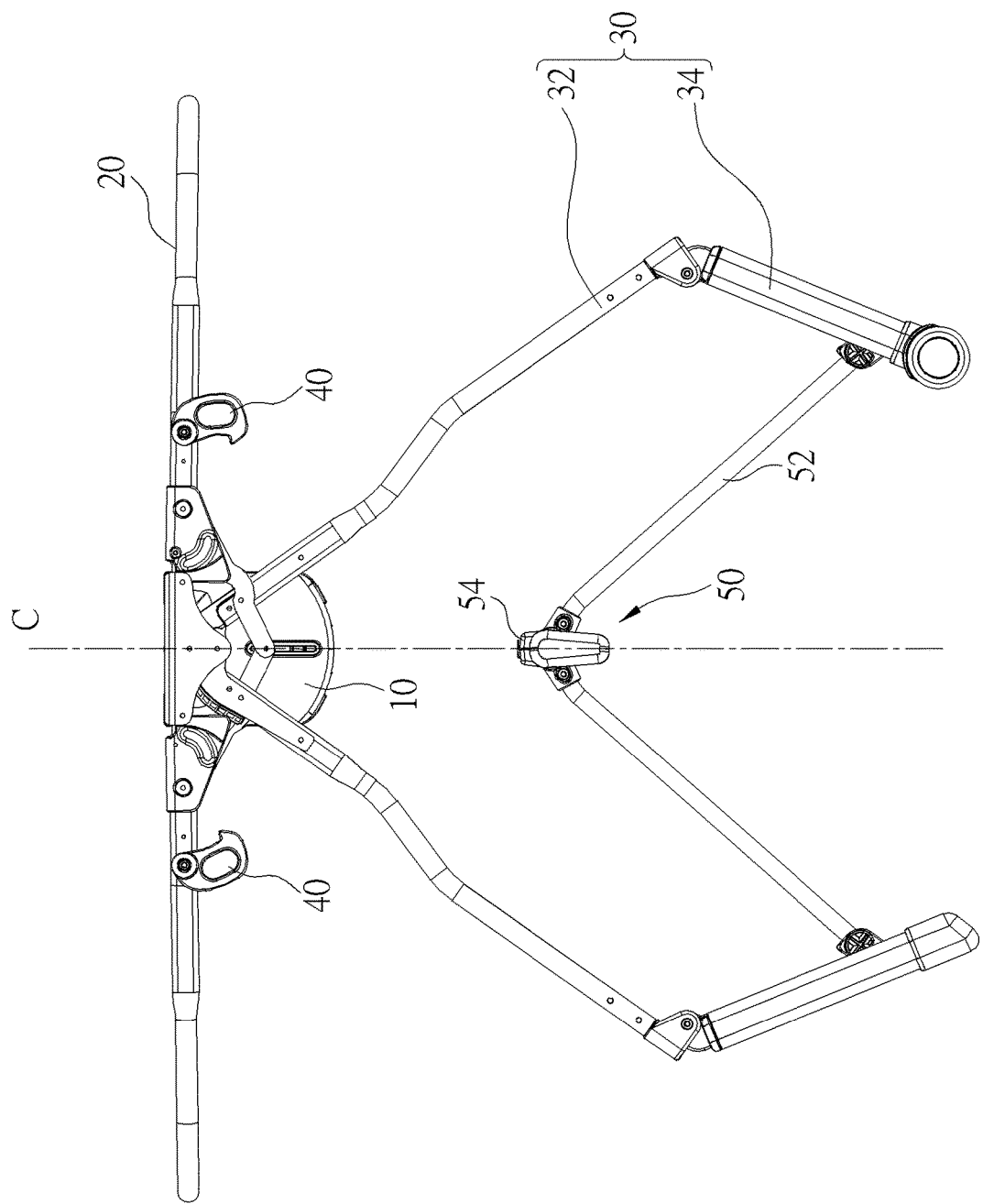
FIG. 7 to FIG. 9 are side views illustrating various states of the play yard being folded by lifting the central member.
Figure 8:
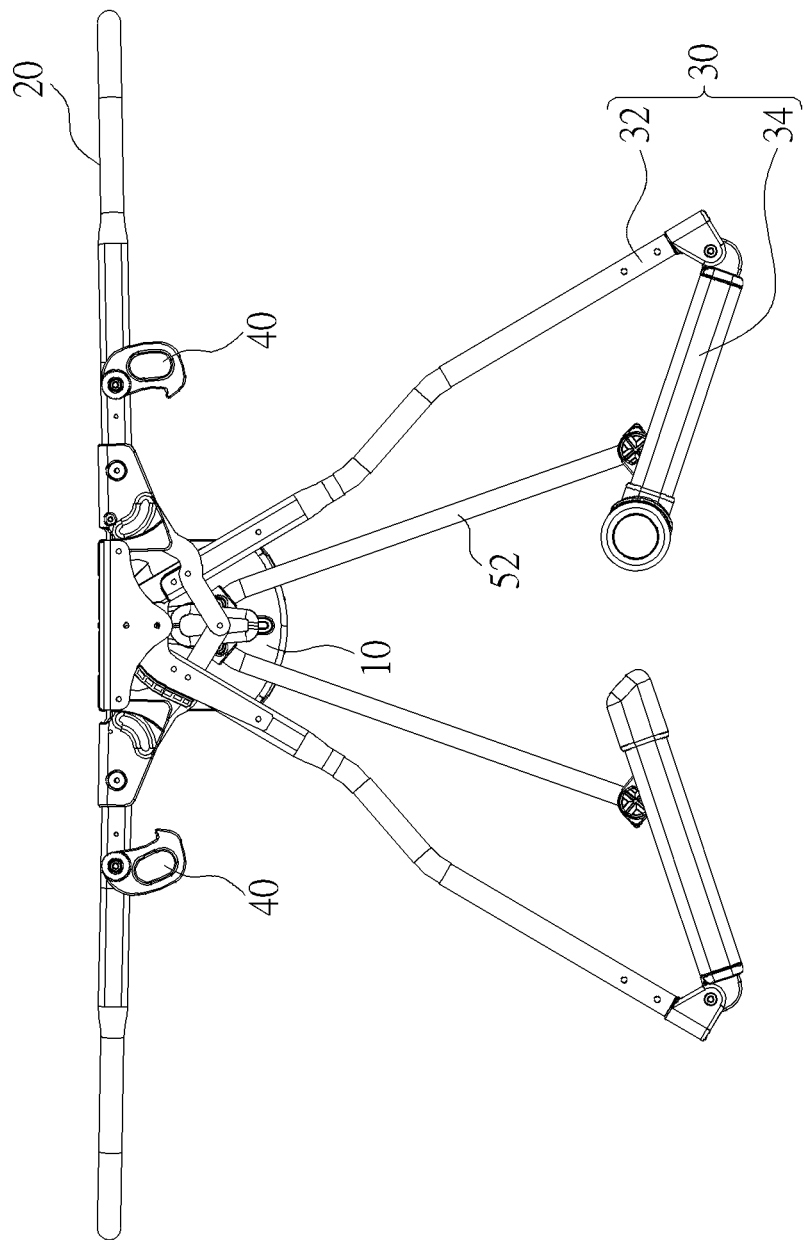
Figure 9:
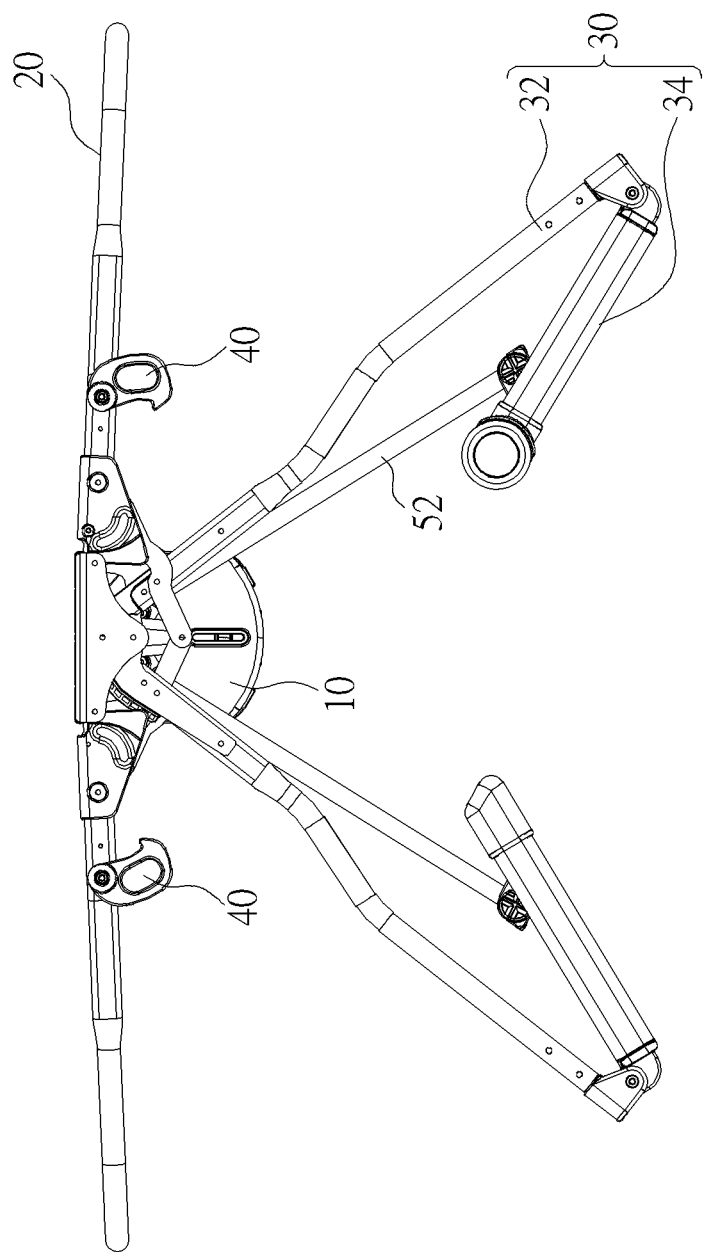

Referring to FIG. 6 to 10, FIG. 6 is a side view illustrating the play yard 1 fully unfolded, FIG. 7 to FIG. 9 are side views illustrating various states of the play yard being folded by lifting the central member 50 along direction H, and FIG. 10 is a side view illustrating the play yard 1 in part being fully folded to the folded position.

As shown in FIG. 6 to FIG. 10, when the latch mechanism 54 unlocks the connecting members 52, the central member 50 is able to be lifted along direction H. When the central member 50 is lifted, the rail members 20, the upper support members 32, the lower support members 34, and the connecting members 52 rotate toward the center C of the play yard 1, such that the rail members 20, the upper support members 32, the lower support members 34, and the connecting members 52 are folded.

Please refer to FIG. 10. At least one of the brackets 10 has engaging recesses 12. When the play yard 1 is configured to the folded position with the rail members 20, the upper support members 32, and the lower support member folded with respect to one another, the two engaging members 40 respectively engage with at least one of the brackets 10, or coupled with the engaging recesses 12 respectively, and the two rail members 20 are retained folded with respect to the brackets 10. As mentioned earlier, the engaging members 40 are spring-loaded and can be pulled to disengage from the engaging recesses 12. When the engaging members 40 are disengaged from the engaging recesses 12, the rail members 20 are made rotatable with respect to the brackets 10 so that the play yard 1 can be unfolded to the unfolded position.

The play yard provided in the invention can be locked in an unfolded position via a latch mechanism or unlocked by the latch mechanism to fold to a folded position, by means of lifting a central member and bringing the rail members, the upper support members, the lower support members, and the connecting members to rotate toward the center of the play yard. A spring-loaded engaging member disposed on the rail member can have engagement with the bracket so that the play yard can be stably retained in the folded position. When the engaging member is operated to disengage from the bracket, the rail members, the upper support members, the lower support members, and the connecting members rotate away from the center of the play yard all the way to the unfolded position until the connecting members can be locked by the latch mechanism, which retains the play yard in the unfolded position. Accordingly, the folding and unfolding process of the play yard of the invention can be performed with minimal steps, such that the operation is very convenient for the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A play yard, configurable to an unfolded position or a folded position, the play yard comprising:
   two brackets;
   two rail members pivotally connected to the brackets; and
   two support frames, each of the support frames comprising two upper support members and a lower support member, the upper support members being pivotally connected to the brackets, the lower support member being pivotally connected to the upper support members;
   wherein when the play yard is configured to the folded position, the rail members, the upper support members, and the lower support members are folded with respect to one another, the lower support members drive the upper support members to fold with respect to the two brackets when the lower support members are folded with respect to the upper support members.

2. The play yard of claim 1, wherein each of the support frames comprises two first hinges, and the lower support member is pivotally connected to the upper support members by the first hinges.

3. The play yard of claim 1, further comprising:
   a central member;
   a plurality of connecting members pivotally connected to the central member and the lower support members; and
   a latch mechanism configured to lock or unlock the connecting members;
   wherein when the latch mechanism locks the plurality of connecting members, the rail members, the upper support members, the lower support members, and the plurality of connecting members are unfolded with respect to each other, and when the latch mechanism unlocks the plurality of connecting members, the rail members, the upper support members, the lower support members, and the plurality of connecting members are able to be folded with respect to each other.

4. The play yard of claim 3, wherein the latch mechanism is disposed on the central member, when the latch mechanism unlocks the plurality of connecting members, the central member is able to be lifted, and when the central member is lifted, the rail members, the upper support members, the lower support members and the plurality of connecting members rotate toward a center of the play yard.

5. The play yard of claim 3, wherein each of the support frames comprises two first hinges, and the lower support member is pivotally connected to the upper support members by the first hinges.

6. The play yard of claim 3, further comprising a plurality of second hinges disposed on the lower support member and the central member, and the plurality of connecting members being pivotally connected to the central member and the lower support member by the plurality of second hinges.

7. The play yard of claim 3, further comprising a soft-goods clothing covering the rail members, the support frames, the central member and the plurality of connecting members.

8. The play yard of claim 3, further comprising two engaging members respectively disposed on each of the two rail members, wherein when the play yard is configured to the folded position with the rail members, the upper support members, and the lower support members are folded with respect to one another, the two engaging members respectively engage with at least one of the brackets and retain the two rail members in the folded position with respect to the brackets.

9. The play yard of claim 8, wherein at least one of the brackets comprises engaging recesses, and when the play yard is configured to the folded position with the rail members, the upper support members, and the lower support members are folded with respect to one another, the two engaging members respectively couple with the engaging recesses and retain the two rail members in the folded position with respect to the brackets.

10. The play yard of claim 8, wherein the two engaging members are spring-loaded and rotatable on each of the two rail members.

11. The play yard of claim 8, wherein when the two engaging members are operated to disengage from the at least one of the brackets, the rail members, the upper support members, the lower support members, and the plurality of connecting members rotate away from a center of the play yard to the unfolded position until the plurality of connecting members are locked by the latch mechanism, so as to retain the play yard in the unfolded position.

12. The play yard of claim 3, wherein each rail member comprises a first engaging portion, and each upper support member comprises a second engaging portion, when each rail member and each upper support member are unfolded with respect to each other, the first engaging portion engages with the second engaging portion, such that each rail member is fixed in a horizontal position, and when the central member is lifted, each upper support member rotates toward a center of the play yard to disengage the second engaging portion from the first engaging portion, such that each rail member is able to rotate toward the center of the play yard.

13. The play yard of claim 3, wherein each upper support member comprises a first stop portion and a second stop portion, and when the upper support members are unfolded, the first stop portion of one of the upper support members abuts against the second stop portion of another one of the upper support members.

14. The play yard of claim 3, further comprising a first linkage member and a second linkage member, each bracket comprising a sliding groove, the first linkage member being pivotally connected to each rail member and the second linkage member, the second linkage member being pivotally connected to the sliding groove, and the second linkage member rotating and sliding with respect to the sliding groove as each rail member is rotated with respect to the brackets between the unfolded position and the folded position.

15. The play yard of claim 1, wherein each rail member comprises a first engaging portion, and each upper support member comprises a second engaging portion, when each rail member and each upper support member are unfolded with respect to each other, the first engaging portion engages with the second engaging portion, such that each rail member is fixed in a horizontal position, and when each upper support member rotates toward a center of the play yard, second engaging portion is disengaged from the first engaging portion, such that each rail member is able to rotate toward the center of the play yard.

16. The play yard of claim 1, wherein each upper support member comprises a first stop portion and a second stop portion, and when the upper support members are unfolded, the first stop portion of one of the upper support members abuts against the second stop portion of another one of the upper support members.

17. The play yard of claim 1, further comprising a first linkage member and a second linkage member, each bracket comprising a sliding groove, the first linkage member being pivotally connected to each rail member and the second linkage member, the second linkage member being pivotally connected to the sliding groove, and the second linkage member rotating and sliding with respect to the sliding groove as each rail member is rotated with respect to the brackets between the unfolded position and the folded position.

18. The play yard of claim 1, further comprising two engaging members respectively disposed on each of the two rail members, wherein when the play yard is configured to the folded position with the rail members, the upper support members, and the lower support members are folded with respect to one another, the two engaging members respectively engage with at least one of the brackets and retain the two rail members in the folded position with respect to the brackets.

19. The play yard of claim 18, wherein at least one of the brackets comprises engaging recesses, and when the play yard is configured to the folded position with the rail members, the upper support members, and the lower support members are folded with respect to one another, the two engaging members respectively couple with the engaging recesses and retain the two rail members in the folded position with respect to the brackets.

20. The play yard of claim 18, wherein the two engaging members are spring-loaded and rotatable on each of the two rail members.

* * * * *